United States Patent [19]

Tanis

[11] Patent Number: 4,900,290
[45] Date of Patent: Feb. 13, 1990

[54] CROP DELIVERY SYSTEM FOR AN AXIAL-FLOW COMBINE

[75] Inventor: Dale R. Tanis, Naperville, Ill.

[73] Assignee: J. I. Case Company, Racine, Wis.

[21] Appl. No.: 236,029

[22] Filed: Aug. 24, 1988

[51] Int. Cl.⁴ ............................................. A01F 12/10
[52] U.S. Cl. ....................................... 460/70; 56/14.6; 209/263
[58] Field of Search ......... 56/14.6; 130/27 T, 27 AB, 130/27 B, 27 R; 209/263, 264; 460/70, 16, 63

[56] References Cited

U.S. PATENT DOCUMENTS

| | | |
|---|---|---|
| 3,529,645 | 9/1970 | Murray et al. |
| 3,556,108 | 1/1971 | Knapp et al. |
| 3,827,443 | 8/1974 | Drayer ............................. 130/27 T |
| 3,828,794 | 8/1974 | Gochanour et al. .............. 130/27 T |
| 4,248,249 | 2/1981 | Dunn et al. ........................ 56/14.6 |
| 4,250,896 | 2/1981 | Wagstaff et al. .................. 130/27 T |
| 4,291,709 | 9/1981 | Weber et al. ...................... 130/27 T |
| 4,489,733 | 12/1984 | Underwood ....................... 130/27 T |
| 4,665,929 | 5/1987 | Helm .................................. 130/27 T |

OTHER PUBLICATIONS

Parts Catalog, Case/IH, 1680 Combine, Issued Jul. 1988, drawing Nos. 9-432 and 9-438.

Primary Examiner—Bruce M. Kosliuk
Attorney, Agent, or Firm—Dressler, Goldsmith, Shore, Sutker & Milnamow, Ltd.

[57] ABSTRACT

A crop delivery system for an axial flow combine having a crop harvesting apparatus and a threshing apparatus including a rotor having an impeller at its forward end. The crop delivery system is interposed between the crop harvesting apparatus and the threshing apparatus. The crop delivery system includes a crop feeder, a transition housing with one or more transport vanes, and a crop delivery vane assembly. The transition housing surrounds the impeller and has an inlet end which opens to the crop feeder and an outlet end which opens to the the threshing apparatus. The crop delivery vane assembly is arranged with the transition housing substantially normal to the rotor and in crop receiving relation with the crop feeder. The vane assembly includes a plurality of delivery vanes for positively moving crop material rearwardly and peripherally outward toward the transport vanes.

5 Claims, 4 Drawing Sheets

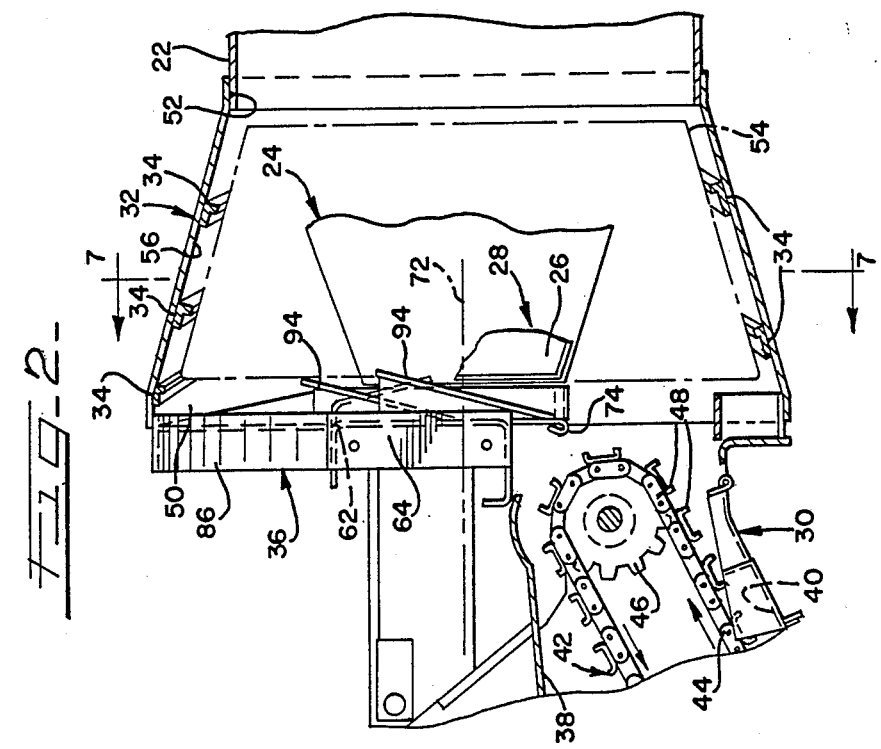
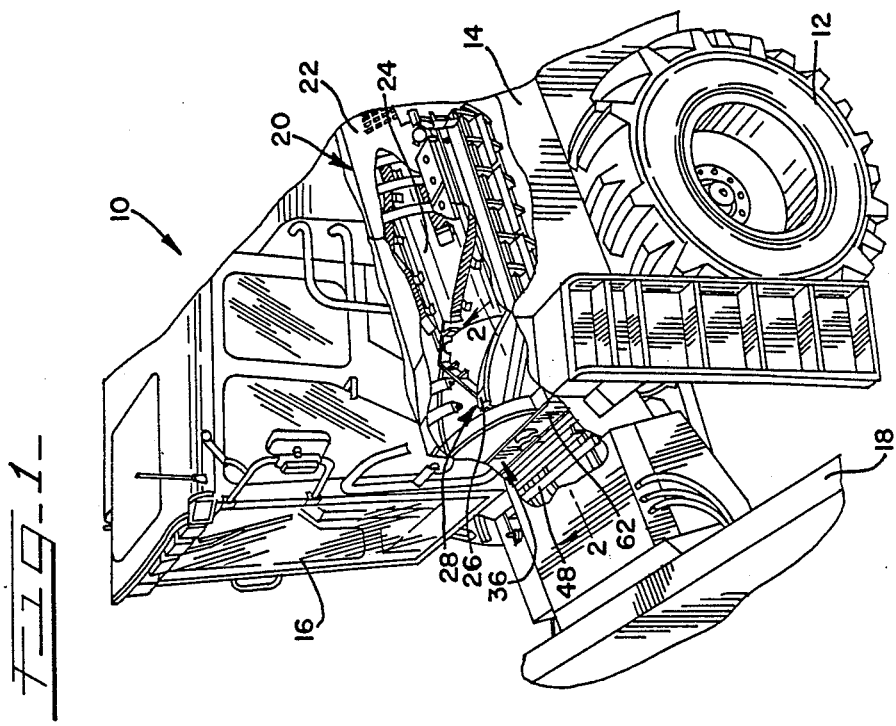

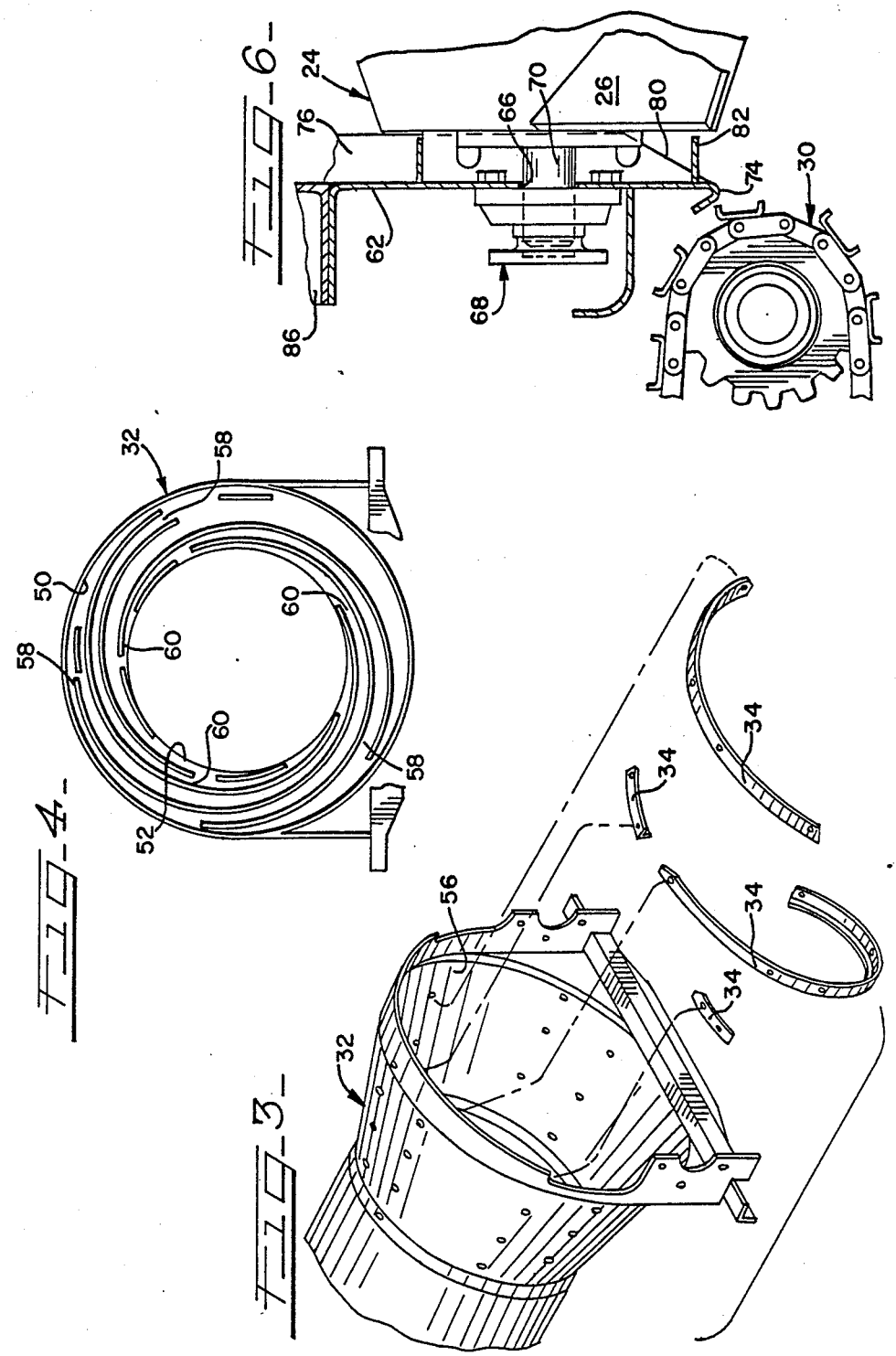

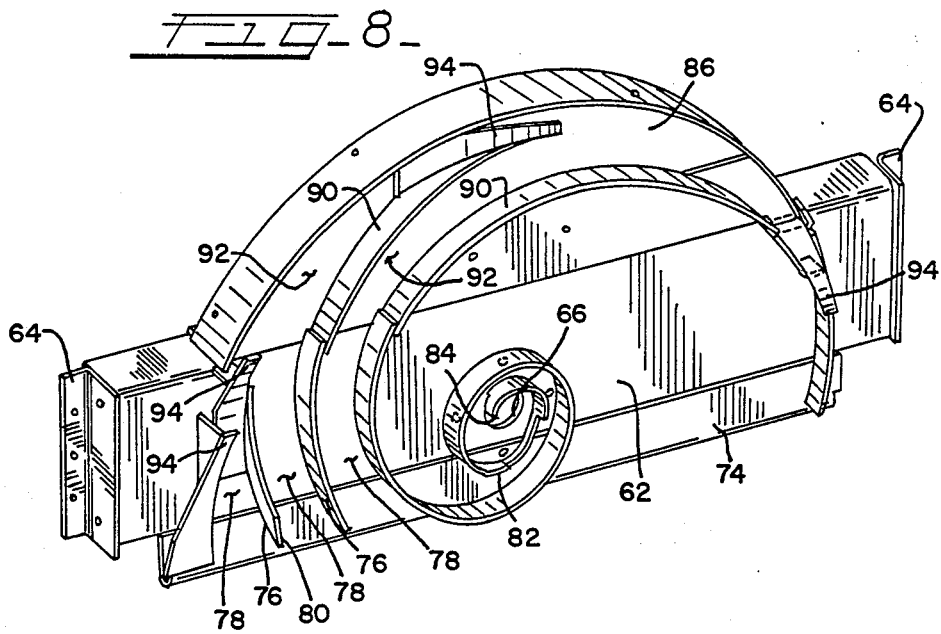
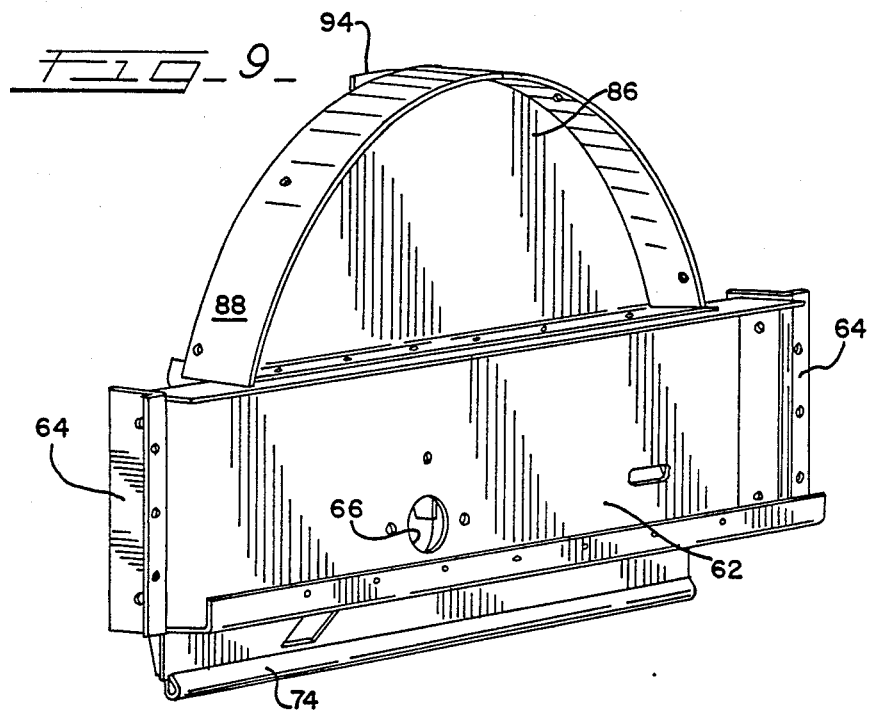

CROP DELIVERY SYSTEM FOR AN AXIAL-FLOW COMBINE

FIELD OF THE INVENTION

The present invention relates generally to harvesting machines and, more particularly, to an axial-flow combine having an apparatus for improving crop delivery to a threshing apparatus of the combine.

BACKGROUND OF THE INVENTION

A common and well known form of harvesting machine is a rotary combine. Rotary combines are available in various designs and models to perform the basic functions of harvesting, threshing, and cleaning of grain or other crop materials.

A typical combine includes a crop harvesting apparatus which reaps planted grain stalks and then feeds the grain stalks to a separating or threshing apparatus. The grain stalks or other crop harvested in the field is rearwardly moved from the crop harvesting apparatus toward the threshing apparatus by a crop feeder mechanism.

The threshing apparatus includes a power driven rotor mounted inside a stationary cylindrical threshing cage. The rotor is supported at opposite ends by bearings. Moreover, the rotor has a series of blades at its forward end defining an impeller. The rotor threshes and separates the grain from the material other than grain. In such a combine, which has been available for a number of years, the grain is threshed several times repeatedly, but gently, as its spirals around the rotor and passes through openings in the threshing cage. Essentially, most material other than grain stays within the threshing cage and is directed out the rear of the combine.

Extending forwardly from the threshing cage and surrounding the impeller is a transition housing. Transition housing has an inlet end which opens to the front of the combine and an outlet end which opens to the threshing apparatus. The feeder mechanism exhausts crop to the inlet end of the transition housing. The internal surface of the transition housing is provided with a series of helically shaped transport vanes for axially conveying or displacing crop material rearwardly between the feeder mechanism and the threshing cage.

The rotor of the threshing apparatus is rotatably driven at speeds ranging between 400 and 1100 rpm. Rotor speed will be determined as a function of the crop being harvested. The impeller blades on the front end of the rotor, turn at the same speed as the rotor. The impeller blades accept crop from the feeder mechanism and are intended to move the crop peripherally outward toward the helical transport vanes for subsequent delivery to the rotor of the threshing apparatus.

Residual crop that is not accepted by the blades or is not peripherally moved toward the helical transport vanes tends to whirl about a forward face of the impeller. Such residual crop also has a tendency to wrap about the front bearing of the rotor causing operational problems for the combine. As will be appreciated, removal and cleaning of such entangled crop from about the front rotor bearing is a time consuming process which detracts from the combine's efficiency. Moreover, residual crop creates a back-feed problem for the feeder mechanism. As will be understood, such residual crop consumes power and destroys the effectiveness of the combine.

Therefore, what is desired is a device which improves crop delivery from the feeder mechanism to the transport vanes for subsequent delivery to the threshing apparatus in a manner reducing or avoiding back-feed to the feeder mechanism and prevents crop from wrapping about the front rotor bearing.

SUMMARY OF THE INVENTION

In view of the above, and in accordance with the present invention, there is provided an improved crop delivery system for a combine having a threshing apparatus including a rotor with an impeller at a forward end thereof. The improved delivery system of the present invention includes a crop delivery vane assembly arranged at the forward end of the impeller for promoting crop movement from the center of the impeller peripherally outward and rearward in a manner substantially avoiding back-feed to the feeder mechanism and which prevents crop entanglement with a forward end of the rotor.

The crop delivery system of the present invention is used in combination with an axial-flow combine having a crop harvesting apparatus at a forward end of the combine. The combine further includes a threshing apparatus including a threshing cage with an elongated rotor journaled at its forward and rear ends by bearings and which is rotatably driven about an axis. The rotor has a series of blades defining an impeller at its forward end. The improved crop delivery system of the present invention is interposed between the crop harvesting apparatus and the threshing apparatus.

As is known, a crop feeder mechanism rearwardly moves crop from the harvesting apparatus toward the threshing apparatus. A transition housing or casing, having a series of open ended spiral transport vanes arranged in its inside surface, surrounds the impeller. The transport vanes accept crop from the impeller and direct it rearwardly toward the threshing apparatus in response to impeller rotation.

A salient feature of the present invention concerns a crop delivery vane assembly. The crop delivery vane assembly is arranged within the transition housing substantially normal to the rotational axis of the rotor. The vane assembly is arranged in crop receiving relation with the feeder mechanism and acts to positively move crop rearwardly and peripherally outward toward the transport vanes.

In a preferred form of the invention, the vane assembly comprises a plurality of spiral shaped delivery vanes which are radially spaced from each other and define channels therebetween. Each delivery vane has a gradual involute shape which provides a greater than 90° included angle between a front edge of the impeller blade and the delivery vane. This relationship promotes peripheral crop movement from the rotor center toward the transport vanes and prevents scissoring of the crop material in its peripheral movement toward the transport vanes.

The vane assembly further includes an anti-wrap vane which protects the forward rotor bearing from crop material which has a tendency to wrap thereabout. The anti-wrap vane defines an inner anti-wrap stripper which creates a self cleaning action for the front rotor bearing during rotation of the rotor.

In a preferred form of the invention, the delivery vanes of the vane assembly positively direct and promote crop material flow toward a ramp surface provided at the terminal end of each delivery vane. Each ramp surface positively moves crop material rearwardly toward an inlet of the transport vanes.

Another aspect of the present invention concerns the provision of a stripper blade in combination with the crop delivery vane assembly. The stripper blade depends from the crop delivery vane assembly and preferably extends across the width of the crop feeder mechanism for directing crop material from the feeder mechanism in a manner inhibiting back-feed on the return run of the conveyor.

The provision of such a crop delivery vane assembly contemplates a reduction in back-feed to the conveyor and reduces crop entanglement about the front rotor bearing. Moreover, the vane assembly of the present invention reduces power requirements of the combine.

Other features and advantages of the present invention will become readily apparent from the following detailed description, the appended drawings, and the accompanying claims.

BRIEF DESCRIPTION OF THE DRAWINGS

FIG. 1 is a fragmentary perspective view, partially broken away, of a combine equipped with the present invention;

FIG. 2 is a sectional view taken along line 2—2 of FIG. 1;

FIG. 3 is a perspective illustration of a transition housing with transport vanes which are securable within the housing;

FIG. 4 is a front elevational view of a transition housing having the transport vanes secured therewithin;

FIG. 6 is a fragementary side sectional view of a crop delivery vane assembly of the present invention as mounted within the combine;

FIG. 8 is a rear perspective view of the crop delivery vane assembly of the present invention; and FIG. 9 is a front perspective view of the crop delivery vane assembly of the present invention.

DETAILED DESCRIPTION OF A PREFERRED EMBODIMENT

Figure 5:
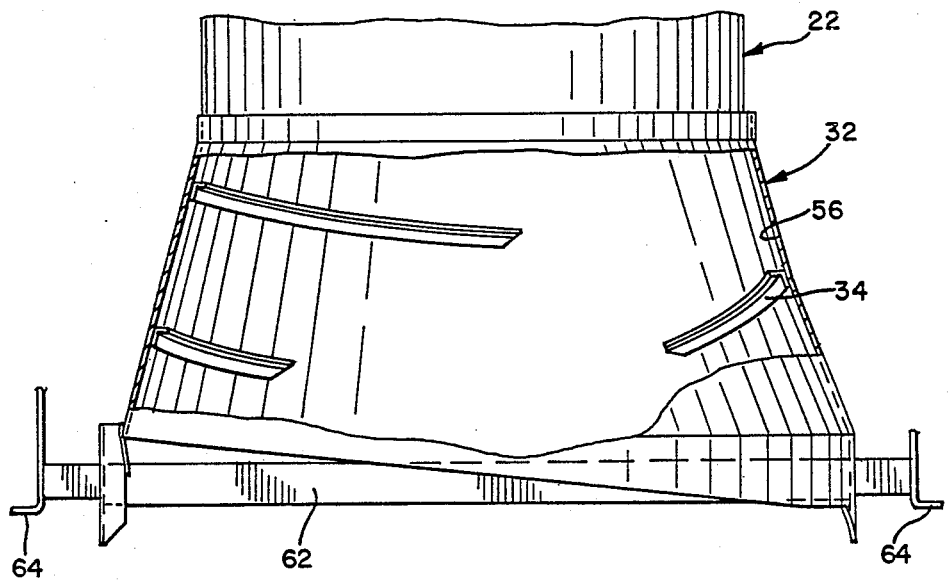
FIG. 5 is a top plan view, partially broken away, illustrating a transition housing having transport vanes secured therewithin.

While the present invention is susceptible of embodiment in various forms, there is shown in the drawings a presently preferred embodiment of the invention which is hereinafter described, with the understanding that the present disclosure is to be considered as an exemplification of the invention, and is not intended to limit the invention to the specific embodiment illustrated.

Referring now to the drawings, wherein like reference numerals indicate like parts throughout the several views, there is shown in FIG. 1 a self propelled combine 10 having front drive wheels 12. The combine further includes a body 14 having an interconnected supporting structure or frame and which defines an operator's station 16.

At its front end, combine 10 is provided with a crop harvesting apparatus or header 18 which can be of any suitable design. The combine is operatively powered by an engine (not shown) suitably housed within body 14, which provides driving power for the combine. The transfer of rotation and power from the engine to the various driven components of the combine is of a conventional nature and could include fixed or variable belt or chain drives which are not shown for purposes of clarity.

The crop harvesting apparatus 18 cuts and directs crop material toward a separating or threshing apparatus 20. Threshing apparatus 20 is rotatably supported by and is enclosed within body 14. In FIG. 1, a side wall of body 14 is broken away so that the threshing apparatus 20 of the combine can be seen.

In its preferred form, the threshing apparatus 20 is illustrated as being of an axial-flow type which includes a threshing cage 22. Located within the threshing cage 22 is a coaxially disposed rotor 24. At its forward end, rotor 24 has a series of blades 26 defining an impeller 28. The general form of such self propelled combine with axial-flow separator is well known and only a brief description is provided here.

The crop delivery system of the present invention is interposed between the crop harvesting apparatus 18 and the threshing apparatus 20. As best illustrated in FIG. 2, the crop delivery system of the present invention includes, in combination, a crop feeder mechanism 30, a transition casing or housing 32 including a series of spiral transport vanes 34, and a crop delivery vane assembly 36.

As best seen in FIG. 2, crop feeder mechanism 30 is pivotally connected to a forward end of the combine. The crop feeder mechanism 30 preferably includes a feeder housing 38 having a floor 40 and a conveyor 42 rotatably mounted in the housing 38. Conveyor 42 includes a pair of laterally spaced, endless drive chains 44 rotatably mounted in housing 38 on sprockets 46. A plurality of laterally elongated drag bars 48 are connected to the chains 44. Drag bars 48 move harvested crop material from the harvesting apparatus 18 across the feeder housing floor 40. Thereafter, drag bars 48 cause the harvested crop material to be fed or directed toward the impeller 28 of rotor 24. As viewed in FIG. 2, the direction of conveyor movement is counterclockwise.

As illustrated in FIG. 2, the forward end of the impeller blades 26 are disposed proximate to a discharge end of the crop feeder mechanism 30. Surrounding the impeller 28 is the transition casing 32. As seen in FIGS. 2 and 3, housing 32 extends forwardly from the threshing cage 22. Transition housing 32 defines an inlet end 50 which opens to the front of the combine and to the feeder mechanism 30 and an exit end 52 which opens to the threshing cage 22.

The trace of the impeller blades 26 is illustrated best in FIG. 2 by reference numeral 54. A series of helically shaped transport vanes 34 are provided in the space defined between the trace of impeller blades 26 and an inner surface 56 of transition housing 32. Preferably, each transport vane 34 is removably secured to housing 32.

As seen in FIG. 4, each transport vane 34 arranged within housing 32 defines an inlet 58 and an outlet 60. The inlet 58 of each transport vane is arranged forward of the outlet 60. Moreover, the inlet 58 of one transport vane is radially spaced from an inlet of another transport vane. In response to impeller rotation, the transport vanes 34 act to direct crop material rearwardly in a "spiraling" manner from the inlet end 50 of the housing 32 toward the outlet end 52 of the housing 32 leading to the threshing apparatus 22.

Crop delivery vane assembly 36 is arranged within and across the transition housing 32. The valve assembly lies in a plane extending substantially normal to the rotational axis of rotor 24 and in crop receiving relation with crop feeder 30. Vane assembly 36 serves a dual purpose. First, vane assembly 36 acts as a bearing support for the forward end of rotor 24. Additionally, vane assembly 36 acts to positively and peripherally move crop toward the transport vanes 34 and axially rearward of the combine.

Figure 7:
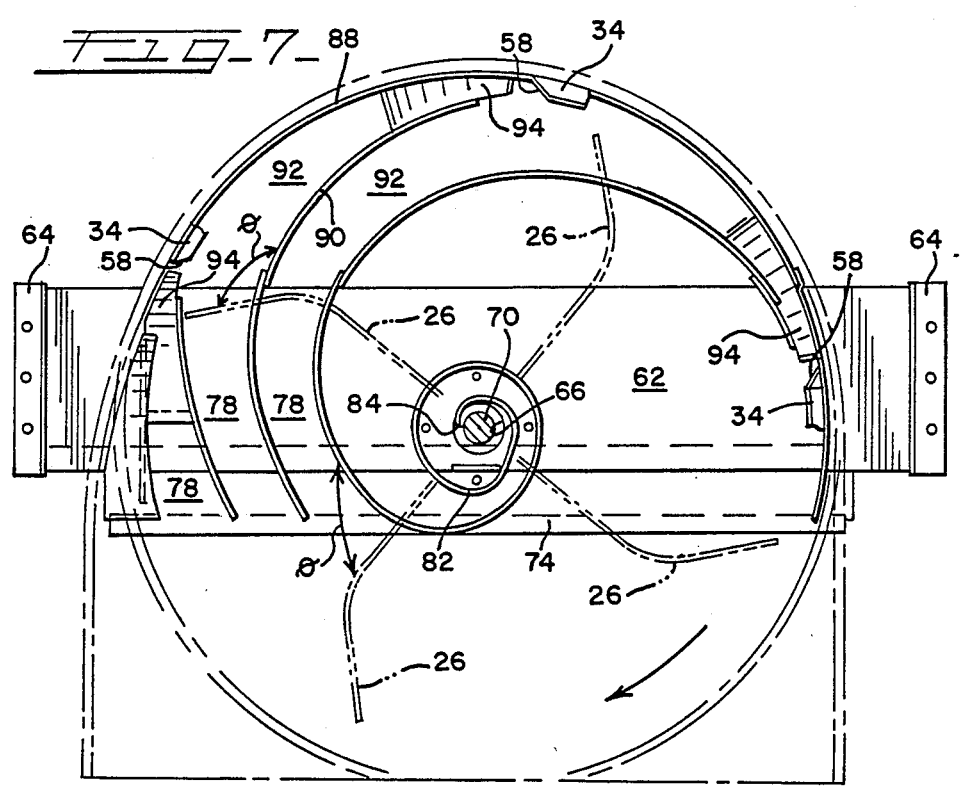
FIG. 7 is a rear elevational view of the crop delivery vane assembly of the present invention.

Vane assembly 36 includes a transversely extended mounting bracket 62. Opposite ends of bracket 62 are provided with mounting plates 64 (FIG. 7). Mounting plates 64 facilitate securement of bracket 62 to the body 14 of the combine. As best illustrated in FIGS. 6, 7, 8 and 9, mounting bracket 62 defines an aperture 66.

Turning to FIG. 6, a forward rotor bearing block 68 is suitably secured to the bracket 62 in general alignment with aperture 66. Rotor 24 is provided with a forwardly extending axial stub shaft 70. Shaft 70 is journalled for rotation in bearing block 68. A similar rotatable mounting arrangement is provided at the opposite end of rotor 24.

As seen in FIG. 2, rotor 24 is mounted for rotation about an extended axis 72. As illustrated, the majority of the crop delivery vane assembly 36 is arranged above the rotational axis 72 of rotor 24. Moreover, the discharge end of the crop feeder 30 is located beneath the rotational axis 72 of rotor 24.

To reduce the amount of back-feed onto an upper return run of conveyor 42, the crop delivery vane assembly 36 preferably includes a stripper 74 which depends from mounting bracket 62. A free end of stripper 74 is proximately arranged relative to the conveyor 42 to urge crop material rearwardly toward the impeller 28.

As illustrated in FIGS. 7 and 8, crop delivery vane assembly 36 further includes a plurality of delivery vanes 76 which project rearwardly from and substantially perpendicular to bracket 62. Each vane 76 has a gradual involute shape and is radially spaced from an adjacent vane to define a recessed channel 78 therebetween. As seen in FIG. 8, each channel 78 is open at its lower end to receive crop material which is swept into the channel under the influence of impeller 28. As illustrated in FIG. 6, a lower end of each delivery vane 76 defines an upwardly inclined surface 80 which promotes the passage of crop material therepast.

Preferably, the radial innermost delivery vane 76 is arcuately extended to define an anti-wrap vane section 82. As illustrated in FIGS. 6 and 7, anti-wrap vane section 82 encompasses and protects rotor shaft 70 from having crop material wound thereabout. To further inhibit crop material from wrapping about shaft 70, vane section 82 defines a stripper blade 84 which will act to strip or cut away crop material that becomes entangled about shaft 70 and could impair operation of rotor 24.

Turning again to FIGS. 2, 6, 8 and 9, in a presently preferred embodiment, vane assembly 36 further includes an upper door 86 which is removably secured to bracket 62 and defines a vertical extension thereof. Door 86 is removably secured at its lower end to mounting bracket 62. Door 86 further includes a mounting flange 88 which facilitates securement of door 86 within the confines of transition housing 32. As with bracket 62, door 86 includes a plurality of radially spaced delivery vanes 90 which define recessed channels 92 therebetween. Each delivery vane 90 has a gradual involute shape. When door 86 is suitably positioned on bracket 62, vanes 90 are designed to coact with vanes 76 on bracket 62 and act as extensions thereof.

As seen in FIG. 7, a cross-sectional profile of each impeller blade 26 is schematically represented in phantom lines. As illustrated in FIG. 7, the gradual involute shape of each vane of the vane assembly 36 provides a greater than 90° included angle $\phi$ between a front edge of each impeller blade and the delivery vane. This relationship promotes crop movement from the center of the rotor toward the periphery of the impeller and to the transport vanes 34. Moreover, a scissoring action of the crop material against the vanes is substantially eliminated to assure proper flow of the crop material through the channels thereby enhancing the ability of vane assembly 36 to positively move crop material toward the transport vanes 34.

Vane assembly 36 further defines a plurality of ramp surfaces 94 located toward a terminal end of each delivery vane. The ramp surfaces 94 extend rearwardly away from bracket 62 and toward the threshing apparatus 20. As best illustrated in FIG. 7, the terminal end of each ramp surface 94 is arranged proximate to an inlet 58 to a transport vane 34.

In operation, the crop harvesting apparatus or header 18 reaps planted crop material and delivers it to the crop feeder 30. Conveyor 42 of the crop feeder 30 receives the harvested crop and feeds it toward the threshing apparatus 20. As the material is discharged from the conveyor 42, stripper 74 acts to urge crop material toward the impeller 28 and inhibit back-feed onto the upper return run of the conveyor.

Crop material is discharged from the feeder mechanism 30 into the rotating impeller 28. As will be understood, the rotary action of the impeller 28 normally causes the crop material discharged toward the periphery of the impeller to move radially outwardly toward any one of several inlets 58 leading to the transport vanes 34. The whirling rotary action of impeller 28 forcibly directs other crop material, disposed on the crop feeder 30 closer to the rotary axis of the impeller, into the plurality of recessed channels defined by crop delivery vane assembly 36. That is, the whirling action of the impeller blades 26, in combination with the spiral-like or involuted design of the delivery vanes positively moves crop material peripherally outward toward the transport vanes 34 on the transition housing.

As the material is moved through the channels, it ultimately reaches the ramp surfaces 94. Ramp surfaces 94 positively move the crop material rearward and, furthermore, introduces crop material to the inlets 58 of the transport vanes and, subsequently, toward the threshing apparatus.

The crop material introduced into the crop delivery vane assembly 36 is entrapped therein as it positively and peripherally moves along the recessed channels defined by the delivery vanes. Such construction reduces the residual crop present at the front of the rotor and, thereby reduces back-feed to the conveyor 42.

If so desired, door 86 on the vane assembly 36 may be readily removed so as to provide access to the impeller 28. As such, the condition of the transport vanes 34 or the impeller blades 26 may be regularly checked without having to disassemble the front of the rotor.

Any crop material which tends to become entangled with or entrained about the front rotor bearing 68 is acted upon by the anti-wrap vane section 82. Stripper blade 84 associated therewith effectively prevents an accumulation of crop material about the rotor shaft 70. The material acted upon by the stripper blade 84 is discharged into a channel and is directed away from the forward end of the rotor so as to prevent a build-up of material thereabout.

The delivery vanes of the vane assembly 36 are formed with a greater than 90° included angle between the front edge of an impeller blade and each delivery vane to avoid scissoring action of the material in the channels of the vane assembly. As such, a free flow of material toward the ramp surfaces 94 and, ultimately, to the transport vanes 34 is assured thereby preventing blockage of any one or more of the channels by crop material.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A crop delivery system for an axial-flow combine having a crop harvesting apparatus at a forward end of said combine, a threshing apparatus including a threshing cage with an elongated rotor rotatably mounted at opposite ends by bearing means, said rotor being driven about a rotational axis and has a series of blades defining an impeller at is forward end, with said crop delivery system being interposed between said crop harvesting apparatus and said threshing apparatus, said crop delivery system comprising:

means for feeding crop materials from said crop harvesting apparatus toward said threshing apparatus;

a transition housing which surrounds the impeller and defines an inlet end and an outlet end, said inlet end opening to the front end of the combine and to the feeding means and said outlet end opening to the threshing apparatus;

one or more spiral transport vanes secured to an internal surface of said housing for directing crop material rearwardly toward said threshing apparatus in response to impeller rotation; and a crop delivery vane assembly arranged at a forward end of and within said transition housing in crop receiving relationship with said feeding means, said vane assembly including a plurality of delivery vanes defining a series of hollow channels which open rearwardly toward a rear end of said combine, said channels extending outwardly and spaced at different radial distances from the rotational axis of said rotor for positively moving crop material rearwardly and peripherally outward toward said transport vanes and wherein each channel includes a rearwardly projecting ramped surface at a terminal end thereof for directing crop rearwardly toward said threshing apparatus and with adjacent ramped surfaces being angularly positioned with respect to each other within said transition housing.

2. The crop delivery system of claim 1 wherein each delivery vane defines a greater than 90° included angle between a front edge of an impeller blade and said delivery vane.

3. The crop delivery system of claim 1 wherein said rotor includes a support shaft arranged at its forward end and said vane assembly includes an anti-wrap vane which encircles a forward portion of said support shaft in a manner inhibiting crop material from wrapping about said support shaft.

4. The crop delivery system of claim 3 wherein said anti-wrap vane defines an inner anti-wrap stripper blade.

5. The crop delivery system of claim 1 wherein said crop delivery vane assembly further includes crop stripper means extending across said feeding means for directing crop material from said feeding means.

* * * * *